US006200608B1

(12) United States Patent
Gmunder et al.

(10) Patent No.: US 6,200,608 B1
(45) Date of Patent: Mar. 13, 2001

(54) PROCESS OF PRODUCING CHEWING GUM BASE IN PARTICLE FORM AND PRODUCT THEREOF

(75) Inventors: Charlean Gmunder, Branchburg; Kenneth M. Kanca, Parlin; Weisheng Li, Montclair; Frederick H. Marshall, Chatham; Edward J. Zuromski, Bridgewater, all of NJ (US)

(73) Assignee: L. A. Dreyfus Co., Edison, NJ (US)

( * ) Notice: Subject to any disclaimer, the term of this patent is extended or adjusted under 35 U.S.C. 154(b) by 0 days.

(21) Appl. No.: 09/520,872

(22) Filed: Mar. 8, 2000

Related U.S. Application Data

(60) Provisional application No. 60/125,314, filed on Mar. 19, 1999.

(51) Int. Cl.$^7$ .................................................. A23G 3/30
(52) U.S. Cl. .................................................................. 426/3
(58) Field of Search ................................................ 426/3, 5

(56) References Cited

U.S. PATENT DOCUMENTS

| H1241 | 10/1993 | Synosky et al. ..................... 426/3 |
|---|---|---|
| 3,190,565 | 6/1965 | Jayne, Jr. . |
| 4,305,962 | 12/1981 | del Angel ............................ 426/3 |
| 4,452,820 | 6/1984 | D'Amelia et al. .................. 426/3 |
| 4,459,311 | 7/1984 | DeTora et al. ...................... 426/3 |
| 4,515,769 | 5/1985 | Merritt et al. ..................... 424/49 |
| 5,154,939 | 10/1992 | Broderick et al. ................. 426/5 |
| 5,397,580 | 3/1995 | Song et al. ......................... 426/5 |
| 5,419,919 | 5/1995 | Song et al. ......................... 426/5 |
| 5,486,366 | * 1/1996 | Song et al. ......................... 426/5 |
| 5,523,097 | 6/1996 | Song et al. ......................... 426/3 |
| 5,543,160 | 8/1996 | Song et al. ......................... 426/3 |
| 5,545,416 | 8/1996 | Broderick et al. ................. 426/3 |
| 5,562,936 | 10/1996 | Song et al. ......................... 426/3 |
| 5,567,450 | * 10/1996 | Zuromski et al. .................. 426/5 |
| 5,571,543 | 11/1996 | Song et al. ......................... 426/5 |
| 5,612,071 | 3/1997 | Song et al. ......................... 426/3 |
| 5,792,495 | * 8/1998 | Degady et al. ..................... 426/5 |

FOREIGN PATENT DOCUMENTS

| 54-52154 | 4/1979 | (JP) . |
|---|---|---|
| 55-109614 | 8/1980 | (JP) . |

* cited by examiner

Primary Examiner—Arthur L. Corbin
(74) Attorney, Agent, or Firm—Steven P. Shurtz; Brinks Hofer Gilson & Lione

(57) ABSTRACT

A free-flowing, particulated gum base comprises particulated rubber ingredients having a size of less than or equal to about 6 millimeters. The gum base is prepared by blending together particulated gum base ingredients including an elastomer, elastomer plasticizer and preferably a filler. The elastomer and elastomer plasticizer may be pre-compounded and then pulverized before being blended with the other gum base ingredients to form the free-flowing, particulated gum base.

26 Claims, 1 Drawing Sheet

PROCESS OF PRODUCING CHEWING GUM BASE IN PARTICLE FORM AND PRODUCT THEREOF

REFERENCE TO EARLIER FILED APPLICATION

The present application claims the benefit of the filing date under 35 U.S.C. § 119(e) of provisional U.S. patent application Ser. No. 60/125,314, filed Mar. 19, 1999, which is hereby incorporated by reference.

BACKGROUND OF THE INVENTION

The present invention relates to chewing gum base, and more particularly to a process for making chewing gum base by providing the to ingredients in free flowing dry form and blending the powder ingredients together into a gum base mixture that can be used to make chewing gum.

Typically, chewing gum base has been made by adding the gum base ingredients into a heated mixer. The gum base ingredients often come in large slabs, bales or solid drums, and have to be ground, crushed or otherwise reduced in size in order to obtain the desired quantity for a batch of gum base and to feed the ingredients into the mixer. In the mixer, the gum base ingredients are compounded and then removed from the mixer in molten form. The molten, finished gum base is processed into various forms such as pellets, slabs, laminated casts, strands, etc., ready for packaging and sale. When used to make chewing gum, the gum base is melted and mixed with the other chewing gum ingredients.

This typical process, though widely used, has several drawbacks. First, many different chewing gum bases have to be prepared, each including either different ingredients or different proportions of ingredients, to meet the needs of different chewing gum manufacturers for each of their products. Since the compounding of chewing gum base typically takes 20 minutes or more in a mixer, making all of the different gum bases takes time. Further, the gum bases then cool prior to being shipped to an end user, who then has to remelt them in the chewing gum mixer.

Of course, there are many known variations to this process. For example, U.S., Pat. Nos. 5,571,543; 5,523,097; 5,419,919 and 5,397,580 disclose processes of making chewing gum base in a continuous fashion. In the example in these patents, a filler with a particle size less than 12 microns and an elastomer sized to 2–7 mm are mixed and added as a mixture. Powdered vegetable oils and molten polyisobutylene are also added.

U.S. Pat. No. 5,567,450 discloses a gum base manufacturing process in which certain dry powder ingredients are pre-blended with liquifiable materials before being mixed with the elastomer.

U.S. Pat. No. 5,486,366 discloses a process of making chewing gum base in a continuous mixer which includes restriction elements. A blend of ground elastomer, filler and elastomer plasticizer (with unspecified particle sizes) is fed into the mixer at one zone and other gum base ingredients are added at a later zone.

In each of these processes, the chewing gum base ingredients are compounded together in a molten form and then cooled before being used to make a chewing gum composition.

Several patents, such as U.S. Pat. Nos. 5,543,160 and 5,545,416 disclose a process by which gum base ingredients are compounded together in the same continuous mixer that is then used to make the chewing gum. While such a process has many benefits, it is not in widespread use, and many chewing gum manufacturers continue to use conventional equipment which operates in a batch system, and therefore desire to add the chewing gum base as an initial ingredient.

It would therefore be a great improvement if there were a less time and energy consuming method of making a variety of gum bases that could still be added as an initial ingredient into a convention chewing gum mixing operation.

BRIEF SUMMARY OF THE INVENTION

In a first aspect, the invention is a method of making a particulated chewing gum base comprising the steps of compounding a hard elastomer and an elastomer plasticizer together in a pre-blend compound, pulverizing the pre-blend compound, and mixing the pulverized pre-blend compound with a particulated gum base softener; thereby forming a blend of particulated gum base ingredients.

In a second aspect, the invention is a particulated chewing gum base comprising a hard elastomer pulverized to less than 0.6 millimeters in size; a filler of less than 20 microns in size; and an elastomer plasticizer, the particulated gum base being a free-flowing mixture of gum base ingredients.

In a third aspect, the invention is a method of making a chewing gum composition comprising the steps of adding a premixed blend of particulated gum base ingredients including an elastomer, an elastomer plasticizer, a filler and a softener to a gum mixer; adding a powdered bulking agent to the gum mixer; adding a flavor to the gum mixer; and mixing the premixed blend of particulated gum base ingredients, powdered bulking agent and flavor to make the chewing gum composition.

In a fourth aspect, the invention is a free-flowing particulated gum base comprising particulated gum base ingredients of a size less than or equal to about 6 millimeters, the gum base being free of liquid ingredients and comprising a pulverized hard elastomer of less than 0.6 millimeters, a pulverized elastomer plasticizer, and softeners having a congealing point greater than 50° C.

In a fifth aspect, the invention is an intermediate ingredient for a particulated chewing gum base comprising a hard elastomer and an elastomer plasticizer; the hard elastomer and elastomer plasticizer being compounded into a homogenous composition and then pulverized to a free-flowing powder having a particle size of less than 6 millimeters.

In a sixth aspect, the invention is a method of making a particulated chewing gum comprising the steps of a) compounding a hard elastomer and an elastomer plasticizer together into a pre-blend compound; b) pulverizing the pre-blend compound; and c) mixing the pulverized pre-blend compound with a particulated gum base softener and a powdered bulk sweetener, thereby forming a blend of particulated chewing gum ingredients.

The particulated gum base of the present invention can be added as an initial ingredient to conventional chewing gum mixers in place of prior art chewing gum base. However, the particulated chewing gum base can be produced with less time and energy consumption than typical prior art gum bases. The preferred particulated gum base uses a novel intermediate compound. The preferred particulated gum base can also be used to make novel particulated chewing gum compositions, where one or more of the chewing gum ingredients is powder blended with the particulated chewing gum base.

These and other advantages of the invention will be best understood in view of the attached drawing.

DETAILED DESCRIPTION OF THE PREFERRED EMBODIMENTS OF THE INVENTION

Figure 1:
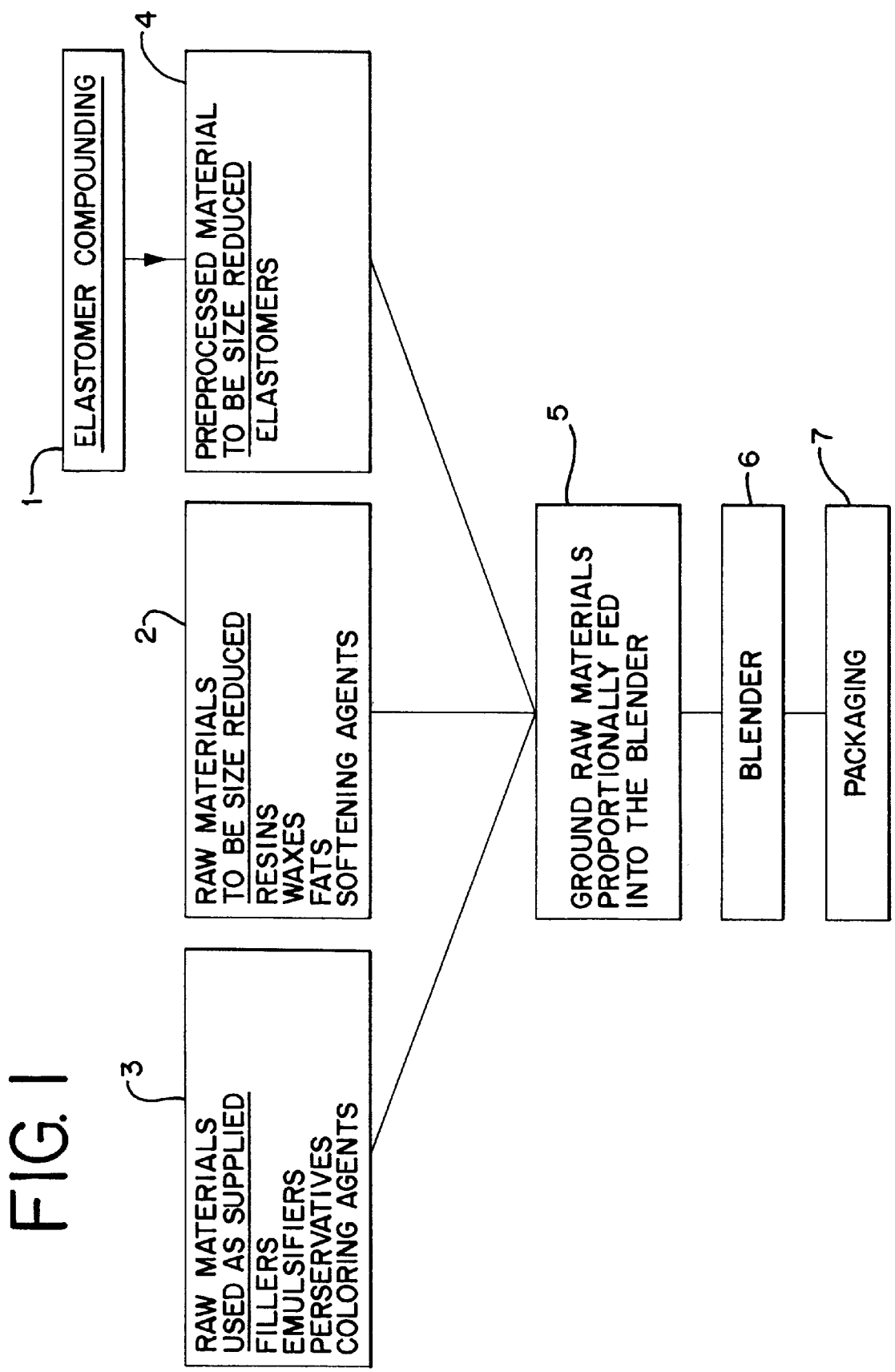
FIG. 1 is a schematic drawing of a preferred process of making a chewing gum base in particulated form according to the present invention.

Unless noted otherwise, all percentages herein are by weight percent. In general, a chewing gum composition typically comprises a water-soluble bulk portion, a water-insoluble chewable gum base portion and typically water-insoluble flavoring agents. Typical powdered bulk sweeteners used to make the gum include sugars and sugar alcohols. The water-soluble portion dissipates with a portion of the flavoring agent over a period of time during chewing. The gum base portion is retained in the mouth throughout the chew. The term chewing gum refers to both a chewing and bubble type gum in its general sense. Traditional chewing gum ingredients are disclosed in several of the above mentioned patents, which are hereby incorporated by reference.

The insoluble portion of the gum typically may contain any combination of elastomers, vinyl polymers, elastomer plasticizers, fillers, softeners, waxes and other optional ingredients such as colorants and antioxidants.

The variety of gum base ingredients typically used provide the ability to modify the chewing characteristics of gums made from the gum base.

Elastomers provide the rubbery, cohesive nature to the gum which varies depending on this ingredient's chemical structure and how it may be compounded with other ingredients.

Natural elastomers may include natural rubber such as smoked or liquid latex and guayule, natural gums such as jelutong, lechi caspi perillo, massaranduba balata, massaranduba chocolate, nispero, rosidinha, chicle, gutta percha, gutta kataiu, niger gutta, tenu, chilte, chiquibul, gutta hang kang. Synthetic elastomers may include high molecular weight elastomers such as butadiene-styrene copolymers and isobutylene-isoprene copolymers, low to high molecular weight elastomers such as polybutadiene arid polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof.

Hard elastomers are elastomers that have Mooney viscosities of greater than 30. Common hard elastomers include isoprene-isobutylene elastomer, often called butyl rubber; butadiene-styrene type elastomer, often called SBR; and polyisobutylene (PIB) elastomers of average GPC molecular weights greater than 75,000.

Butadiene-styrene type elastomers typically are copolymers of from about 20:80 to 60:40 styrene:butadiene monomers. The ratio of these monomers effects the elasticity of the SBR as evaluated as Mooney viscosity. As the styrene:butadiene ratio decreases, the Mooney viscosity decreases. Typical Mooney viscosities for these elastomers are from about 40 to 80 ML1+3@210° F.

Isobutylene-isoprene type elastomers have molar percent levels of isoprene ranging from 0.2 to 4.0. Typical Mooney viscosities for these elastomers range from 30 to 75 ML1+8@250° F. The average molecular weights of these elastomer may range from 200,000 to 1,000,000.

The structure of SBR typically consists of straight chain 1,3-butadiene copolymerized with phenylethylene (styrene). The structure of butyl rubber typically consists of branched 2-methyl-1,3-butadiene (isoprene) copolymerized with 2-methylpropene (isobutylene).

Polyisobutylene type elastomers are polymers of 2-methylpropene. These elastomers provide soft chew characteristics to the gum base and still provide the elastic qualities as do the other elastomers. Average molecular weights may range from about 30,000 to 120,000. PIB having GPC average molecular weights greater than and equal to 75,000, for the purpose of the present invention, are hard elastomers. Those PIB's with GPC average MW 75,000 are, for the purposes of the present invention, soft elastomers.

Vinyl polymeric and copolymeric type elastomers provide tack resistance, vary the chew characteristics of gums made from these bases and offer hydrophilic properties beneficial to sensory perception of the final gums.

For copolymeric types, the amount of vinyl laurate, vinyl stearate, or ethylene present in the vinyl laurate/vinyl acetate (VL/VA), vinyl stearate/vinyl acetate (VS/VA), or ethylene/vinyl acetate (EVA) copolymers respectively typically ranges from about 10 to about 60 percent by weight of the copolymer. Average molecular weights of these polymers may range from about 2,000 to about 80,000. Ball and ring softening points of these polymers may range from about to 50 to 120° C. Polyvinyl acetate having an average molecular weight from about 8,000 to about 52,000 are preferred for use in the gum base and gum of the present invention. More preferred for chewing gum bases are those of from about 10,000 to about 35,000 molecular weight, and for bubble gum bases, those having from about 30,000 to about 60,000 molecular weight.

Vinyl polymers typically release flavor quickly, and using iso-alkanic waxes exhibiting small crystalline structure with these vinyl polymers extends flavor release.

Petroleum waxes aid in the curing of the finished gum made from the gum base as well as improve shelf-life and texture. Wax crystal size when hard also improves the release of flavor. Those waxes high in iso-alkanes have a smaller crystal size than those waxes high in normal-alkanes, especially those with normal-alkanes of carbon numbers less than 30. The smaller crystal size allows slower release of flavor since there is more hindrance of the flavor's escape from this wax versus a wax having larger crystal sizes.

Synthetic waxes are produced by means atypical of petroleum wax production The synthetic waxes may include waxes containing branched alkanes and copolymerized with monomers such as, but not limited to, propylene and polyethylene and Fischer-Tropsch type waxes. Polyethylene wax is not in the same category as polyethylene, a polymer of ethylene monomers.

Elastomer plasticizers vary the firmness of the gum base. Their specificity on elastomer inter-molecular chain breaking (plasticizing) along with their varying softening points cause varying degrees of finished gum firmness when used in base. This is also important when one wishes to provide more elastomeric chain exposure to the alkanic chains of the waxes.

Elastomer plasticizers include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester resin, synthetic elastomer plasticizers such as terpene resins derived from alpha- pinene, beta-pinene and/or d-limonene, and mixtures thereof.

The elastomer plasticizers used may be of one type or of combinations of more than one. Typically, the ratios of one to the other are dependent on each respective softening point, on each effect on flavor release, and on each respective degree of tack they cause to the gum. Ball and ring softening points of the rosin ester types described above may range from about 60 to about 120° C. Softening points of the terpene resins may range from about 60 to about 130° C. and an average molecular weight of from about 500 to 2,000.

Occasionally, both terpene and rosin ester resins may be used in the present invention. The terpene: rosin ester ratios may range from about 1:15 to about 15:1.

Softeners modify the texture, cause the hydrophobic and hydrophilic components of the base to be miscible, and may further plasticize the synthetic elastomers of the gum base. Softeners include fully hydrogenated oils of cottonseed, soybean, palm, palm kernel, coconut, safflower and the like, as well as monoglycerides, diglycerides, acetylated monoglycerides, distilled mono- and diglycerides and de-oiled or "powdered" lecithin. The glycerides and lecithin are sometimes referred to as emulsifiers.

Fillers used in gum base modify the texture of the gum base and aid in processing. Fillers include carbonate or precipitated carbonated types such as magnesium and calcium carbonate, ground limestone and silicate types such as magnesium and aluminum silicate, clay, alumina, talc, as well as titanium oxide, mono- di- and tricalcium phosphate, cellulose polymers such as ethyl, methyl and wood or mixtures thereof.

Other optional ingredients such as antioxidants and colorants may also be used in the gum base.

Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), beta-carotenes, tocopherols, acidulants such as Vitamin C, propyl gallate, other synthetic and nature types or mixtures thereof in free-flowing ground or pulverized form.

Flavorants and colorants impart characteristics or remove or mask undesired characteristics. Colorants and flavorants include FD&C type lakes, plant extracts, fruit and vegetable extracts, titanium dioxide, cocoa powder or mixtures thereof in free-flowing ground or pulverized form.

Particle size reduction, herein referred to as "grinding" or "pulverizing," is used to prepare ingredients for use in the present invention. This grinding or pulverizing is accomplished by those knowledgeable in the art of doing this and the act or process of pulverizing or grinding these ingredients is described herein as examples of a typical process and is in no way meant to limit the scope of the claims of this invention.

Furthermore, there may arise at times, whether by customer request or processing benefits, non-pulverized or non-ground gum base and/or chewing gum ingredients added to the inventive particulated gum base. Examples of ingredients added this way include, but are not limited to, antioxidant tablets such as BHA, fats, softeners, colorants, flavorants, or pre-blends of these with ingredients such as waxes and fats. Pre-blends like this sometimes allow "blocks" of these pre-blends to be added to optimize processing. Non-pulverized or non-ground gum base and/or gum ingredients added to the inventive particulated gum base is not to be construed as an avoidance of the scope of this invention's claims.

Typical pulverizing or grinding begins by first course grinding bulk gum base ingredients followed by fine grinding. Shredders, pulverizers, grinders, etc. are typically used to do this. Preferably, the pulverizing process is done under cool environments, not excluding cryogenic pulverizing. These terms are familiar to those knowledgeable in this art.

While the particle size of the hard elastomer and filler are most important, other gum base ingredients that will eventually melt when made into chewing gum, such as fats and wax, need to be sized so that they form a homogeneous mix that does not allow ingredients to settle out during transportation. The maximum particle sizes in the gum base should typically be less than 6 millimeters, and more preferably less than 3 millimeters. Preferably, all of the particulated gum base ingredients will have a small particle size. The gum base will be more easily manufactured into chewing gum the smaller the size of the particulated ingredients. Therefore, it would be preferable to make the ingredients into as small of a size as possible. However, it is costly to grind ingredients, and very costly and not presently practical to grind hard elastomers to very small size particles. Presently, it is preferred to pulverize the gum base ingredients to a size of 0.6 millimeters or less. Particle size as used herein and in the claims is determined by a sieve analysis. For example, particles of 0.6 millimeters or less will pass through a sieve having openings 0.6 millimeters square.

Ingredients suitable for use in the particulated gum base of the preferred embodiment of the invention are those that remain solid at ambient or room temperatures. This may be determined, and not meant to limit the scope of the present invention, to be around 75° F. Capillary and congealing melting points of the fats and softeners are preferably greater than or equal to about 50° C., which typically would result in fats remaining solid at around 75° F. or lower.

Liquid ingredients are not present in the preferred particulated gum base of the present invention to a functional degree. By functional degree it is meant that the level of liquid ingredients present in the particulated gum base will not appreciatively cause the pulverized ingredients or the final inventive gum base from re-agglomerating or have reduced free-flowing particulate dry form. By free-flowing it is meant that the particulated gum base may be poured from a container at a relatively even flow rate, as opposed to coming out of the container in large clumps. It is obvious that small amounts of liquids such as emulsifiers and softeners, when mixed with other ingredients such as fillers, may result in these liquid ingredients to be able to present in the invention. The act of doing this is in no way meant to avoid the scope of the present invention.

The preferred elastomers for use in the present invention include styrene-butadien rubber, isoprene-isobutylene copolymer and soft polyisobutylene. The preferred vinyl polymers for use in the present invention include polyvinyl acetate of GPC average molecular weight from about 10,000 to about 65,000.

Preferably, the gum base of the present invention contains petroleum waxes containing little if any normal-alkanes, or straight-chained alkanes as they may be called, and contain predominantly iso-alkanes, or branched chain alkanes, having carbon chain lengths greater than about 30.

More preferably, the inventive gum base is free of wax or comprises only synthetic wax.

The preferred elastomer plasticizers used in the present invention are natural rosin esters such as glycerol ester of partially hydrogenated rosin, glycerol ester of rosin, glycerol ester of tall oil rosin, partially hydrogenated methyl esters of rosin, synthetic elastomer plasticizers such as terpene resins, and mixtures thereof.

More preferably, the elastomer plasticizers used are glycerol ester of partially hydrogenated rosin, glycerol ester of rosin, glycerol ester of tall oil rosin, synthetic elastomer plasticizers such as terpene resins derived from alpha-pinene, beta-pinene and/or d-limonene, and mixtures thereof.

The preferred softeners for use in the present invention include fully saturated oils that contain, as one or more of their constituent groups, fatty acids of carbon chain length of from 6 to 18.

More preferred are the triglycerides having a total summated saturated caproic, caprylic, capric, lauric, myristic and palmitic fatty acid content of from about 8 to about 60 percent by weight of the fatty acids, determined from the fatty acid methyl ester distribution by gas chromatography. The caproic, caprylic, capric, myristic, lauric and palmitic acids of the triglycerides also plasticize the synthetic elastomers more than triglycerides containing predominantly stearic fatty acid. As examples, triglycerides high in saturated lauric fatty acid more effectively plasticize the polyvinyl acetate polymer, increasing the branching.

Liquid fats and oils and triglycerides of non-hydrogenated and partially hydrogenated oils are not present in the preferred embodiments of the present invention to an appreciative or functional degree. These types of softeners typically have melting points below 50° C. melting point. These fats may be subsequently added to the inventive base during the production of gum. Likewise, soft elastomers such as low molecular weight polyisobutylene may be mixed with the particulated gum base during the gum making operation.

The preferred softeners for use in the present invention are de-oiled lecithin, glycerol monostearate, mono and di-glycerides, each of which have capillary melting points greater than 50° C.

The grinding of the fats and glycerides further than their typical solid form received in is preferred. These ingredients may be added in flaked form, if the customer so desires. Addition, to the inventive gum base, of these and other ingredients in flaked form in no way avoids the scope of the present invention.

No grinding is required for fillers since they are usually supplied in fine particulate form. Particle size has an effect on cohesiveness, density and processing characteristics of the gum base and its compounding. The smaller the particle size, the more dense and cohesive the final gum base is. Also, by selecting fillers based on their particle size distribution, initial mass compounding may be varied, thus allowing alteration of the compounding characteristics of the initial mass during gum base processing and ultimately the final chew characteristics of gums made from these gum bases.

Talc filler may be used in the gum base and gum of the present invention that may come in contact with or employ acid flavors or provide an acidic environment needed to prevent degradation of an artificial sweetener by reacting with calcium carbonate type fillers. Mean particle size for calcium carbonate and talc fillers of the present invention are preferably less than 20 microns, and more preferably may range from about 0.1 micron to about 15 microns, and most preferably are between about 2 and 10 microns in size.

Preferably, the fillers used in the gum base and gum of the present invention are calcium carbonate, ground limestone, talc, mono-, di- and tricalcium phosphate, zirconium silicate, or mixtures thereof.

More preferably, the fillers used have a mean particle size range from about 0.4 to about 14 microns and are calcium carbonate and talc.

Optionally, the inventive gum base is free of filler, allowing the user to add the desired type and amount of filler, tailored to his needs.

If required, ingredients capable of preventing already pulverized ingredients stored individually from re-agglomerating may be used. Fillers, rosin esters, terpene resins, synthetic waxes, and fats that are ground, or optionally added in a flaked form in the case of fats and softeners, are examples of ingredients able to keep the individually ground or pulverized gum base ingredients as well as the inventive gum base from re-agglomerating and in a free-flowing form.

Cold storage also is helpful, along with agitation of the ground material during storage. Preferably, the ingredients are immediately admixed into a final particulated gum base and packaged.

Transfer of the particulated gum base is achieved by means typically known in the art and is not included in the scope of the present invention. Any typical means can be used, as long as the environment is suitable to keep the particulated ingredients from re-agglomerating, such as in the absence of excessive heat, excessive moisture, low agitation and excessive pressure. An example of possible transfer of the ingredients is by way of pneumatic conveyers.

FIG. 1 illustrates a typical and preferred process of the invention.

Hard elastomers, such as styrene-butadiene rubber, butyl rubber, high molecular weight polyisobutylenes and the like are first pre-compounded with elastomer plasticizers such as rosin esters and terpene resins. Generally, the pre-blend compounded material will comprise between about 20% and about 80% hard elastomer and between about 20% and about 80% elastomer plasticizer. Optionally, fillers, colorants, etc. may be added to this pre-blend compound. Preferably, filler alone is added and PIB also, if PIB is required as an ingredient in the final gum base formulation.

Pre-compounded is done (1) in the presence of heat and shear to prepare the hard, and optional soft elastomers, for pulverizing. This is all done in a suitable mixer such as a sigma blade or continuous mixer. The hard elastomer does not have to be ground prior to the pre-compounding step except as necessary to feed it into the mixer, or as required by the type of mixer that is being used. A heat source providing temperatures of between about 80° C. and 150° C. is preferred for the pre-compounding. Medium or high shear is also typically used. This pre-blend is then removed from the mixer and particulated (4) to the appropriate size of less than or equal to about 6 millimeters, preferably to 3 millimeters, and most preferably to 0.6 millimeters.

The preferred ingredients and the preferred ranges in the pre-compounded blends are shown in Table 1. Examples 1–24 of pre-compounded blends are shown in Table 2.

TABLE 1

| | Percent | |
|---|---|---|
| | Minimum | Maximum |
| Hard Elastomer | 20 | 80 |
| SBR | 0 | 80 |
| Butyl Rubber | 0 | 80 |
| Soft Elastomer | 0 | 30 |
| Polyisobutylene | 0 | 29 |
| Elastomer Plasticizer | 20 | 80 |
| Rosin Ester | 0 | 80 |
| Terpene Resin | 0 | 80 |
| Filler | 0 | 70 |
| Calcium Carbonate | 0 | 70 |
| Talc | 0 | 70 |

TABLE 2

|  | 1 | 2 | 3 | 4 | 5 | 6 | 7 | 8 | 9 | 10 | 11 | 12 |
|---|---|---|---|---|---|---|---|---|---|---|---|---|
| Hard Elastomer | | | | | | | | | | | | |
| SBR | 23 | 20 | 0 | 22 | 0 | 0 | 18 | 16 | 0 | 0 | 7 | 6 |
| Butyl Rubber | 0 | 0 | 28 | 0 | 38 | 36 | 0 | 0 | 22 | 26 | 0 | 19 |
| Polyisobutylene | 16 | 0 | 10 | 5 | 7 | 11 | 11 | 24 | 13 | 19 | 25 | 22 |
| Rosin Ester | 16 | 80 | 0 | 20 | 0 | 0 | 14 | 13 | 16 | 0 | 8 | 10 |
| Terpene Resin | 0 | 0 | 14 | 0 | 17 | 11 | 0 | 0 | 0 | 10 | 0 | 0 |
| Filler | | | | | | | | | | | | |
| Calcium Carbonate | 45 | 0 | 48 | 0 | 38 | 42 | 57 | 0 | 49 | 37 | 60 | 43 |
| Talc | 0 | 0 | 0 | 53 | 0 | 0 | 0 | 47 | 0 | 8 | 0 | 0 |
|  | 100 | 100 | 100 | 100 | 100 | 100 | 100 | 100 | 100 | 100 | 100 | 100 |
|  | 13 | 14 | 15 | 16 | 17 | 18 | 19 | 20 | 21 | 22 | 23 | 24 |
| Hard Elastomer | | | | | | | | | | | | |
| SBR | 33 | 0 | 0 | 0 | 20 | 13 | 24 | 0 | 0 | 38 | 0 | 42 |
| Butyl Rubber | 0 | 31 | 80 | 32 | 0 | 0 | 0 | 21 | 17 | 0 | 39 | 0 |
| Polyisobutylene | 0 | 0 | 0 | 0 | 0 | 0 | 0 | 0 | 0 | 0 | 0 | 0 |
| Rosin Ester | 48 | 0 | 0 | 36 | 15 | 0 | 0 | 0 | 33 | 19 | 14 | 0 |
| Terpene Resin | 0 | 38 | 20 | 0 | 0 | 17 | 31 | 48 | 0 | 0 | 0 | 29 |
| Filler | | | | | | | | | | | | |
| Calcium Carbonate | 19 | 31 | 0 | 0 | 65 | 0 | 0 | 31 | 50 | 43 | 0 | 29 |
| Talc | 0 | 0 | 0 | 32 | 0 | 70 | 45 | 0 | 0 | 0 | 47 | 0 |
|  | 100 | 100 | 100 | 100 | 100 | 100 | 100 | 100 | 100 | 100 | 100 | 100 |

Ingredients not part of the pre-compounding step ar, held ready for use (2). These may include resins, waxes, fats, softening agents and soft elastomers. These ingredients are preferably particulated to be blended with the pulverized pre-blend compound. Particulated PVAc, particulated wax and particulated gum base softeners are typical ingredients held ready for use.

Ingredients already in particulate form are prepared for use (3). These may include fillers, emulsifiers, preservatives and colorants.

Next, the ingredients are metered by desired weight (5) into a blending vessel (6), such as a conical mixer able to provide agitation by mechanical means. The blending vessel may be optionally cooled to aid in keeping the inventive gum base in free-flowing form.

After desired agitation, to suitably blend the ingredients during a designated time, the inventive particulated base is packaged to desired weight (7). Packaging may be shipping containers such as boxes, cloth or plastic sacks, bags, etc.

Preferred particulated gum base compositions have (by weight of the gum base) 1) between about 2% and about 43% of a pre-blend of hard elastomers and elastomer plasticizers; 2) up to about 45% elastomer plasticizer, which is preferably 0 to 45% resin ester and/or 0–24% terpene resin; 3) up to about 46% filler, which is preferable 0–39% calcium carbonate and/or 0–31% talc; 4) between about 4% and about 47% softeners; 5) up to about 36% polyvinyl acetate; 6) up to about 36% wax, which is preferably 0–36% microcrystalline wax and/or 0–6% paraffin wax; 7) up to about 2% antioxidant; and 8) up to about 4% colorant.

Table 3 shows the composition of 24 example particulated gum bases using the pre-compounded blends of Table 2. These are presented to exemplify embodiments of the present invention and in no way are presented to limit the scope of the present invention.

TABLE 3

|  | 1 | 2 | 3 | 4 | 5 | 6 | 7 | 8 | 9 | 10 | 11 | 12 |
|---|---|---|---|---|---|---|---|---|---|---|---|---|
| Table 2, Blend 1 | 2 | | | | | | | | | | | |
| Table 2, Blend 2 | | 4 | | | | | | | | | | |
| Table 2, Blend 3 | | | 5 | | | | | | | | | |
| Table 2, Blend 4 | | | | 7 | | | | | | | | |
| Table 2, Blend 5 | | | | | 4 | | | | | | | |
| Table 2, Blend 6 | | | | | | 9 | | | | | | |
| Table 2, Blend 7 | | | | | | | 11 | | | | | |
| Table 2, Blend 8 | | | | | | | | 18 | | | | |
| Table 2, Blend 9 | | | | | | | | | 12 | | | |
| Table 2, Blend 10 | | | | | | | | | | 16 | | |
| Table 2, Blend 11 | | | | | | | | | | | 8 | |
| Table 2, Blend 12 | | | | | | | | | | | | 6 |
| Table 2, Blend 13 | | | | | | | | | | | | |
| Table 2, Blend 14 | | | | | | | | | | | | |
| Table 2, Blend 15 | | | | | | | | | | | | |
| Table 2, Blend 16 | | | | | | | | | | | | |

TABLE 3-continued

| | 1 | 2 | 3 | 4 | 5 | 6 | 7 | 8 | 9 | 10 | 11 | 12 |
|---|---|---|---|---|---|---|---|---|---|---|---|---|
| Table 2, Blend 17 | | | | | | | | | | | | |
| Table 2, Blend 18 | | | | | | | | | | | | |
| Table 2, Blend 19 | | | | | | | | | | | | |
| Table 2, Blend 20 | | | | | | | | | | | | |
| Table 2, Blend 21 | | | | | | | | | | | | |
| Table 2, Blend 22 | | | | | | | | | | | | |
| Table 2, Blend 23 | | | | | | | | | | | | |
| Table 2, Blend 24 | | | | | | | | | | | | |
| Rosin Ester | 21 | 13 | | 45 | 13 | | 5 | | 11 | 16 | 12 | 17 |
| Terpene Resin | | | 24 | | 12 | 14 | | 23 | 18 | | | |
| CaCO3 | 15 | | 35 | | | 16 | 38 | 26 | 39 | | | |
| Talc | | 25 | | 25 | | | | | 7 | 24 | | 13 |
| Softeners | 24 | 14 | 25 | 4 | 6 | 22 | 17 | 6 | 13 | 16 | 47 | 31 |
| Polyvinyl Acetate | 25 | 26 | 10 | 12 | 38 | 36 | 28 | 26 | | 12 | | |
| Microcrystalline Wax | 10 | 16 | | | 5 | 26 | | | | 8 | 33 | 27 |
| Paraffin Wax | | | | 2 | | | | | | 6 | | |
| Antioxidant | 1 | 1 | 1 | | 1 | 1 | | 1 | | 1 | | 2 |
| Colorant | 2 | 1 | | | | 2 | 1 | | | 1 | | 4 |
| | 100 | 100 | 100 | 100 | 100 | 100 | 100 | 100 | 100 | 100 | 100 | 100 |

| | 13 | 14 | 15 | 16 | 17 | 18 | 19 | 20 | 21 | 22 | 23 | 24 |
|---|---|---|---|---|---|---|---|---|---|---|---|---|
| Table 2, Blend 1 | | | | | | | | | | | | |
| Table 2, Blend 2 | | | | | | | | | | | | |
| Table 2, Blend 3 | | | | | | | | | | | | |
| Table 2, Blend 4 | | | | | | | | | | | | |
| Table 2, Blend 5 | | | | | | | | | | | | |
| Table 2, Blend 6 | | | | | | | | | | | | |
| Table 2, Blend 7 | | | | | | | | | | | | |
| Table 2, Blend 8 | | | | | | | | | | | | |
| Table 2, Blend 9 | | | | | | | | | | | | |
| Table 2, Blend 10 | | | | | | | | | | | | |
| Table 2, Blend 11 | | | | | | | | | | | | |
| Table 2, Blend 12 | | | | | | | | | | | | |
| Table 2, Blend 13 | 26 | | | | | | | | | | | |
| Table 2, Blend 14 | | 39 | | | | | | | | | | |
| Table 2, Blend 15 | | | 31 | | | | | | | | | |
| Table 2, Blend 16 | | | | 23 | | | | | | | | |
| Table 2, Blend 17 | | | | | 16 | | | | | | | |
| Table 2, Blend 18 | | | | | | 12 | | | | | | |
| Table 2, Blend 19 | | | | | | | 11 | | | | | |
| Table 2, Blend 20 | | | | | | | | 18 | | | | |
| Table 2, Blend 21 | | | | | | | | | 10 | | | |
| Table 2, Blend 22 | | | | | | | | | | 18 | | |
| Table 2, Blend 23 | | | | | | | | | | | 39 | |
| Table 2, Blend 24 | | | | | | | | | | | | 43 |
| Rosin Ester | | | 31 | 24 | | | | | 26 | 21 | | 18 |
| Terpene Resin | 21 | 4 | | | 1 | 9 | 7 | 8 | | | | |
| CaCO3 | 18 | 6 | 22 | | | | 27 | 12 | | 23 | | |
| Talc | | | | 31 | 25 | 21 | | | 9 | | 30 | 22 |
| Softeners | 29 | 28 | 8 | 20 | 25 | 20 | 34 | 34 | 24 | 12 | 10 | 16 |
| Polyvinyl Acetate | | | | | | | | | | | | |
| Microcrystalline Wax | 4 | 23 | 6 | | 23 | 36 | 20 | 28 | 31 | 25 | 20 | |
| Paraffin Wax | | | | | | | | | | | | |
| Antioxidant | 1 | | 2 | | | 1 | 1 | | | | 1 | |
| Colorant | 1 | | | 2 | | 1 | | | | 1 | | 1 |
| | 100 | 100 | 100 | 100 | 100 | 100 | 100 | 100 | 100 | 100 | 100 | 100 |

Gums were made from the pulverized base examples of Table 3. Compositions of the inventive base were individually added to (1) sigma blade, (2) single-shaft continuous, or (3) twin-screw continuous mixers. The mixers were heated to 80 to 150° C. and had medium to high shear mixing capability. After from about 10 to 20 minutes of inventive base processing, gum ingredients such as sweeteners, flavors, etc. were added. The final gum was removed or extruded from the mixers after about 10 to 25 minutes from the time the gum ingredients were added to the base being processed in the mixer.

It is contemplated that if the hard elastomer were pulverized to a small enough size, the pre-blend compounding step of the preferred method would be unnecessary. It is believed that very small size elastomer particles, for example, 0.2 millimeters in size, could be blended with other gum base ingredients and later used to make chewing gum.

While not preferred, it is, of course, possible to take the particulated gum base and mix it into a molten state in a mixer and then discharge it and cool it as a conventional gum base before it is used to make chewing gum.

The advantages of the preferred embodiments of the invention are primarily in the simplification of the gum base manufacturing process. There are reduced processing, preparation and packaging costs compared to the conventional method of making gum base. Also, tailor-weighed products can be shipped to customers for direct and complete addition to conventional gum mixers. Also, the particulated gum base may be easily metered by automatic feeders.

There are also benefits and improvements compared to non-traditional chewing gum manufacturing. For example, in the process disclosed in U.S. Pat. No. 5,543,160, where the gum base and chewing gum are all made in one continuous mixer, the elastomer was added in a particle size of about 2–7 mm. Thus, a significant portion of the overall length of the blade-and-pin mixer was required to masticate the elastomer and compound the gum base before the gum ingredients were added. Using a particulated gum base wherein the elastomer is 0.6 millimeters or less would require less mixing, and hence less equipment length, in a continuous gum making operation.

It should be appreciated that the methods and compositions of the present invention are capable of being incorporated in the form of a variety of embodiments, only a few of which have been illustrated and described below. The invention may be embodied in other forms without departing from its spirit or essential characteristics.

For example, one or more of the traditional chewing gum ingredients could be mixed with the gum base ingredients when the blend of particulated gum base ingredients is being made. That gum ingredient would then not need to be added later when the gum base was being used to make chewing gum. For example, all or part of the powdered bulk sweetener used in the gum could be blended with the particulated gum base ingredients, or a part of the particulated gum base ingredient, before being added to the gum mixer. If a sweetener were added to the particulated gum base, the material would be less likely to agglomerate, especially if the filler were not added until the chewing gum was actually being made. Also, the gum manufacturer would need less material handling equipment if the sweetener and other powdered chewing gum ingredients were included with the particulated chewing gum base.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is therefore indicated by the appended claims rather than by the forgoing description. All changes which come within the meaning and range of equivalency of the claims are to be embraced within their scope.

What is claimed is:

1. A method of making a particulated chewing gum base comprising the steps of:
   a) compounding a hard elastomer and an elastomer plasticizer together into a pre-blend compound;
   b) pulverizing the pre-blend compound into a free-flowing powder; and
   c) mixing the free-flowing powder with a particulated gum base softener, thereby forming a free-flowing powder blend of particulated gum base ingredients.

2. The method of claim 1 wherein a soft elastomer is also compounded with the pre-blend compound before it is pulverized.

3. The method of claim 2 wherein the soft elastomer comprises polyisobutylene with an average GPC molecular weight of less than 75,000.

4. The method of claim 1 wherein each of the ingredients used to make the particulated gum base has a size of less than 6 millimeters.

5. The method of claim 1 wherein a powdered filler is also compounded with the pre-blend compound before it is pulverized.

6. The method of claim 1 wherein the pre-blend compound comprises between about 20% and about 80% hard elastomer and about 20% and about 80% elastomer plasticizer.

7. The method of claim 1 wherein the hard elastomer is selected from the group consisting of styrene-butadiene rubber, butyl rubber, polyisobutylene with an average GPC molecular weight greater than 75,000 and mixtures thereof.

8. The method of claim 1 wherein the elastomer plasticizer is selected from the group consisting of rosin ester, terpene resin and mixtures thereof.

9. The method of claim 1 wherein a powdered filler is also mixed with the blend of particulated gum base ingredients to make the particulated gum base.

10. The method of claim 1 wherein an additional elastomer plasticizer is also mixed with the blend of particulated gum base ingredients to make the particulated gum base.

11. The method of claim 1 wherein a particulated wax is also mixed with the blend of particulated gum base ingredients to make the particulated gum base.

12. The method of claim 1 wherein a particulated polyvinyl acetate is also mixed with the blend of particulated gum base ingredients to make the particulated gum base.

13. A particulated chewing gum base comprising:
   a) a hard elastomer pulverized to less than 0.6 millimeters in size;
   b) a filler of less than 20 microns in size; and
   c) a particulated elastomer plasticizer;
   d) the particulated gum base being a free-flowing powder mixture of gum base ingredients.

14. The particulated chewing gum base of claim 13 wherein the maximum particle size in the mixture is 6 millimeters.

15. The particulated chewing gum base of claim 13 wherein the elastomer plasticizer is pre-compounded with the elastomer, and then the pre-compounded blend is pulverized.

16. The particulated chewing gum base of claim 15 wherein a soft elastomer is also pre-compounded with the hard elastomer and elastomer plasticizer.

17. The particulated chewing gum base of claim 13 further comprising an emulsifier.

18. The particulated chewing gum base of claim 13 packaged into a shipping container.

19. A method of making a chewing gum composition comprising the steps of:
   a) adding a premixed free-flowing powder blend of solid, particulated gum base ingredients, including a hard elastomer, an elastomer plasticizer, a filler and a softener, to a gum mixer;
   b) adding a powdered bulking agent to the gum mixer;
   c) adding a flavor to the gum mixer; and
   d) mixing the premixed blend of particulated gum base ingredients, powdered bulking agent and flavor to make the chewing gum composition.

20. The method of claim 19 wherein at the time the powdered bulking agent is starting to be mixed with the gum base ingredients, the gum base ingredients are still in the form of a premixed blend or solid, particulated ingredients.

21. The method of claim 19 wherein the powdered bulking agent is blended with the gum base ingredients before being added to the mixer.

22. The method of claim 19 wherein the hard elastomer has a particle size of about 0.6 millimeters or less.

23. The method of claim 19 wherein the hard elastomer and elastomer plasticizer are compounded together and pulverized before being made into the premixed blend of solid, particulated gum base ingredients.

24. A free-flowing gum base powder blend comprising particulated gum base ingredients of a size less than or equal to about 6 millimeters, said gum base being free of liquid ingredients and comprising a pulverized hard elastomer of less than 0.6 millimeters, a pulverized elastomer plasticizer, and softeners having a congealing point greater than 50° C.

25. A homogeneous, free-flowing powder for a particulated chewing gum base comprising:
   a) a hard elastomer and
   b) an elastomer plasticizer;
   c) the hard elastomer and elastomer plasticizer being compounded into a homogeneous composition and then pulverized to form a free-flowing powder having a particle size of less than 6 millimeters.

26. A method of making a particulated chewing gum comprising the steps of:
   a) compounding a hard elastomer and an elastomer plasticizer together into a pre-blend compound;
   b) pulverizing the pre-blend compound into a free-flowing powder; and
   c) mixing the pulverized pre-blend compound with a particulated gum base softener and a powdered bulk sweetener, thereby forming a free-flowing powder blend of particulated chewing gum ingredients.

* * * * *

UNITED STATES PATENT AND TRADEMARK OFFICE
CERTIFICATE OF CORRECTION

PATENT NO. : 6,200,608 B1
DATED : March 13, 2001
INVENTOR(S) : Charlean Gmunder et al.

It is certified that error appears in the above-identified patent and that said Letters Patent is hereby corrected as shown below:

Column 15,
Line 2, after "blend" delete "or" and substitute -- of -- in its place.

Signed and Sealed this

Twenty-fifth Day of November, 2003

JAMES E. ROGAN
*Director of the United States Patent and Trademark Office*